United States Patent
Liu et al.

(10) Patent No.: US 7,631,810 B2
(45) Date of Patent: Dec. 15, 2009

(54) SYSTEMS, METHODS, AND COMPUTER PROGRAM PRODUCTS FOR SUPPORTING MULTIPLE APPLICATIONS AND MULTIPLE INSTANCES OF THE SAME APPLICATION ON A WIRELESS SMART DEVICE

(75) Inventors: Ming-Li Liu, Foster City, CA (US); Pradeep Kumar, Fremont, CA (US); William S. Johnson, Jr., Sunnyvale, CA (US)

(73) Assignee: Vivotech, Inc., Santa Clara, CA (US)

( * ) Notice: Subject to any disclaimer, the term of this patent is extended or adjusted under 35 U.S.C. 154(b) by 0 days.

(21) Appl. No.: 11/641,557

(22) Filed: Dec. 19, 2006

(65) Prior Publication Data

US 2008/0147508 A1  Jun. 19, 2008

(51) Int. Cl.
*G06K 7/08* (2006.01)
*G06K 19/06* (2006.01)
(52) U.S. Cl. .................. 235/451; 235/375; 235/380; 235/487; 235/492
(58) Field of Classification Search ............. 235/380, 235/375, 451, 492, 487; 705/17
See application file for complete search history.

(56) References Cited

U.S. PATENT DOCUMENTS

| | | | |
|---|---|---|---|
| 6,220,510 B1 * | 4/2001 | Everett et al. | 235/380 |
| 6,317,832 B1 * | 11/2001 | Everett et al. | 713/172 |
| 6,564,995 B1 * | 5/2003 | Montgomery | 235/379 |
| 6,612,486 B2 * | 9/2003 | Sato et al. | 235/375 |
| 6,776,332 B2 * | 8/2004 | Allen et al. | 235/380 |
| 6,824,064 B2 * | 11/2004 | Guthery et al. | 235/492 |
| 2002/0175207 A1 | 11/2002 | Kashef et al. | |
| 2004/0118930 A1 * | 6/2004 | Berardi et al. | 235/492 |
| 2008/0212558 A1 * | 9/2008 | Aillaud et al. | 370/345 |

FOREIGN PATENT DOCUMENTS

WO  WO 00/08611  2/2000

OTHER PUBLICATIONS

"Frequently Asked Questions—MasterCard Paypass Specifications", MasterCard International Incorporated, 5-11257, pp. 1-4 (Jul. 2005).

"MasterCard Paypass—Terminal Implementation Guide", MasterCard International Incorporated, pp. 1-61 (2004).

(Continued)

*Primary Examiner*—Thien M. Le
*Assistant Examiner*—Tuyen K Vo
(74) *Attorney, Agent, or Firm*—Jenkins, Wilson, Taylor & Hunt, P.A.

(57) ABSTRACT

Systems, methods, and computer program products for supporting multiple applications and multiple instances of the same application on a wireless smart device are disclosed. According to one aspect, the subject matter described herein includes a system for supporting multiple instances of the same application. The system includes a wireless smart device for communicating with a wireless reader. The wireless smart device includes multiple instances of the same application for performing wireless transactions with an external device. The wireless smart device also includes an application manager for identifying one of the instances as active, for detecting a request from a wireless reader for performing a wireless transaction, and for communicating the request to the active instance.

78 Claims, 3 Drawing Sheets

OTHER PUBLICATIONS

Hauke Meyn, "Identification cards—Contactless integrated circuit(s) cards—Proximity cards—Part 4: Transmission protocol", International Organisation for Standardisation, ISO/IEC JTC 1/SC 17/WG 8 (Mar. 10, 2000).

EMV, "Integrated Circuit Card—Specifications for Payment Systems—Book 1—Application Independent ICC to Terminal Interface Requirements", EMVCo, LLC, Version 4.1 (May 2004).

EMV, "Integrated Circuit Card—Specifications for Payment Systems—Book 3 — Application Specification", EMVCo, LLC, Version 4.1 (May 2004) .

European Search Report for European Application No. 07150164.7-2221 (May 8, 2008).

Baentsch et al., "JavaCard-From Hype to Reality," IEEE Concurrency, pp. 36-43 (Oct. 1999).

Chen at al., "Understanding Java Card 2.0," http://www.javaworld.com, pp. 1-10 (Mar. 1998).

Communication pursuant to Article 94(3) for European Application No. 07150164.7 (Nov. 6, 200).

* cited by examiner

SYSTEMS, METHODS, AND COMPUTER PROGRAM PRODUCTS FOR SUPPORTING MULTIPLE APPLICATIONS AND MULTIPLE INSTANCES OF THE SAME APPLICATION ON A WIRELESS SMART DEVICE

TECHNICAL FIELD

The subject matter described herein relates to effecting wireless payment and other transactions using wireless smart devices. More particularly, the subject matter described herein relates to systems, methods, and computer program products for supporting multiple applications and multiple instances of the same application on a wireless smart device.

BACKGROUND

With the success and widespread prevalence of the use of credit and debit cards for banking transactions, card issuers, such as banks and financial institutions, have turned to wireless smart devices as a means to provide their customers with a richer, more powerful set of features than is possible using a traditional magnetic stripe ("magstripe") credit card.

As used herein, the term "smart device" refers to a device with processing capabilities. A smart device may have onboard memory or other storage capacity, may be written to as well as read from, and may contain one or more applications that perform a particular function. Some smart devices may contain an operating system and/or user interface.

As used herein, the term "wireless smart device" refers to a smart device that can communicate via an electric and/or magnetic field between the device and some other entity, usually a wireless terminal or reader. One type of wireless communications that can be used between a wireless smart device and reader is near field communication (NFC). In one form of near field communication, a wireless smart device may communicate with a reader via inductive coupling of the reader antenna to the device antenna. The two loop antennas effectively form a transformer. The reader amplitude-modulates the RF field to send information to the device. The device communicates with the reader by modulating the loading on the device antenna, which also modulates the load on the reader antenna.

As used herein, the term "payment application" refers to an application that performs a payment or other financial transaction. An example payment application might respond to a request for credit card account information, for example, by providing credit card information, such as the credit card number, the name of the card holder, and the expiration date of the card—i.e., information that is typically coded onto the magnetic stripe of traditional credit cards.

Unlike magstripe cards, which are read-only devices that simply report account information to the magstripe card reader, wireless smart devices containing payment applications may have processing capability with which to perform functions, such as encryption/decryption of data, authentication, authorization, and verification of the user or of the user's transaction, storage and/or validation of the card-holder's identification, and so on. Wireless smart devices may interact with wireless readers to enable transactions involving the payment application. Examples of wireless smart devices containing payment applications include mobile phones, smart phones, key fobs, physical cards, personal digital assistants with interfaces to local card readers, and devices provisioned with a soft card.

As used herein, the term "soft card" refers to a software-implemented identity, security, authentication, membership, loyalty, electronic payment, or other card that is loadable onto a device with wireless communications capabilities.

An example of wireless communications commonly used by wireless smart devices is the ISO 14443 interface. The ISO/IEC 14443 specification (hereinafter referred to as the "14443 Specification") defines a communication protocol for wireless smart devices operating at 13.56 MHz in close proximity with a reader antenna. Applications are uniquely identified by an application identifier (AID), defined by the ISO/IEC 7816 specification. An AID has two parts: a 5-byte registered application provider ID (RID), which is issued by a 14443 controlling authority, and a proprietary application identifier extension (PIX), which is assigned by the registered application provider as it sees fit and which may be from one to eleven bytes.

Some applications may limit the number of instances of that application that a wireless smart device may contain. For example, the protocol for the MasterCard Worldwide (formerly MasterCard International) MasterCard PayPass® product, which is a contactless device used for banking transactions, defines two AIDs, one for the MasterCard® brand and another for the Maestro® brand, and does not support multiple instances of the same PayPass® application (i.e., with the same AID) within one wireless smart device. Other payment applications that prohibit a wireless smart device from containing more than one application of the same type include American Express® ExpressPay$^{SM}$ and JCB® QUICPay™. Application types other than payment applications, such as identity, security, authentication, membership, loyalty, or other application type, may also similarly prohibit a wireless smart device from containing more than one instance of the same application.

There are advantages to allowing multiple instances of the same application on a wireless smart device. For example, it may be desirable to have multiple payment applications from a single financial institution or brand on a single wireless smart device, to allow the consumer to use a single wireless smart device as both a credit card and a debit card, as both a personal card and a corporate card, as both a card with a high credit limit and a card with a low credit limit, and so on. Another advantage is to allow the user multiple card issuer (such as MasterCard) accounts from different financial institutions. None of these advantages are available to the user of a payment or other type of application that does not support multiple instances of the same application on a single wireless smart device. It will be appreciated that the advantages associated with allowing a wireless smart device to support multiple instances of the same application are not limited to payment applications but extend to other types of applications as well.

Accordingly, there exists a need for a system, method, and computer product for providing multiple instances of the same application on a wireless smart device.

SUMMARY

According to one aspect, the subject matter described herein includes a system for supporting multiple instances of the same application. The system includes a wireless smart device for communicating with a wireless reader. The wireless smart device includes multiple instances of the same application for performing wireless transactions with an external device. The wireless smart device also includes an application manager for identifying one of the instances as active, for detecting a request from the wireless reader for performing a wireless transaction, and for communicating the request to the active instance.

According to another aspect, the subject matter described herein includes a system for supporting multiple applications. The system includes a wireless smart device that includes multiple applications for performing wireless transactions with an external device. The wireless smart device also includes an application manager for detecting a request from a wireless reader for performing a wireless transaction, for identifying one of the applications as the target of the request, for determining that the target application is active, and, responsive to that determination, communicating the request to the target application.

According to another aspect, the subject matter described herein includes a method for supporting multiple instances of the same application on a wireless smart device. The method includes receiving, using an application manager residing within a wireless smart device having multiple instances of the same application for effecting wireless transactions with an external device, a request from a wireless reader for effecting a transaction, and responsive to that request, identifying one of the instances as active and sending a request for effecting the transaction to the active instance. The method also includes receiving, using the active instance, the request from the application manager for effecting the transaction, and, responsive to that request, sending a response to the wireless reader.

According to another aspect, the subject matter described herein includes a method for supporting multiple applications on a wireless smart device. The method includes receiving, using an application manager residing within a wireless smart device having multiple applications for performing wireless transactions with an external device, a request from a wireless reader for effecting a transaction, and responsive to that request, identifying one of the applications as a target of that request, determining if the target application is active, and responsive to that determination, communicating the request to the target application. The method also includes receiving, using the target application, the request from the application manager for effecting the transaction, and, responsive to that request, sending a response to the wireless reader.

The subject matter described herein for providing multiple instances of the same application on a wireless smart device may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, application specific integrated circuits, and downloadable electrical signals. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

In accordance with the subject matter disclosed herein, systems, methods, and computer program products are provided for providing multiple instances of the same application on a wireless smart device.

Figure 1:
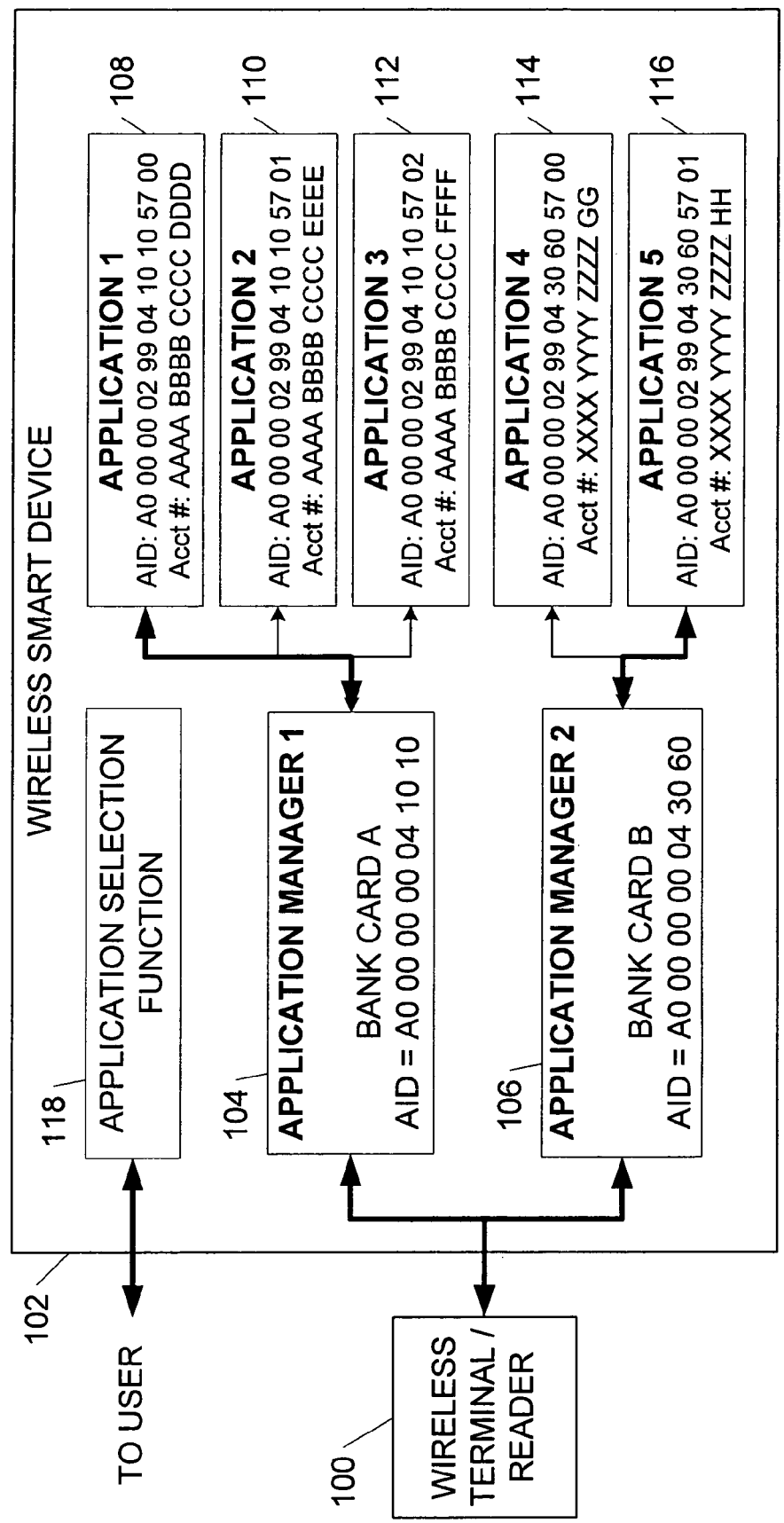
FIG. 1 is a block diagram illustrating an exemplary wireless smart device according to an embodiment of the subject matter described herein.

FIG. 1 is a block diagram illustrating an exemplary wireless smart device according to an embodiment of the subject matter therein. In FIG. 1, a wireless terminal or reader 100 communicates with wireless smart device 102. Device 102 may contain one or more application managers; two are shown in FIG. 1: application manager 1 104 and application manager 2 106. Each application manager may communicate with multiple applications, such as applications for performing wireless transactions with an external device. Such applications may include identity, security, authentication, membership, loyalty, electronic payment, or other application type. In some embodiments, an application manager may manage multiple instances of the same application. In some embodiments, an application may manage multiple different applications, which may include multiple applications of different types. Application manager 1 104 manages application 1 108, application 2 110, and application 3 112, while application manager 2 106 manages application 4 114 and application 5 116. In the exemplary embodiment illustrated in FIG. 1, each application is a payment application and each payment application may represent an account at a bank or other financial entity. Each account may have an account number associated with it (e.g., "AAAA BBBB CCCC DDDD"). Application manager 1 104 may manage payment applications of a particular type, such as MasterCard PayPass®, which has an AID of "A0 00 00 00 04 10 10". Application 1 108, application 2 110, and application 3 112 may represent multiple instances of the same type (i.e., MasterCard PayPass®), and each instance may represent a separate MasterCard account having a unique account number. Similarly, application manager 2 106 may manage payment applications of another type, such as Maestro PayPass®, which has an AID of "A0 00 00 00 04 30 60". Application 4 114 and application 5 116 may represent multiple instances of another type (i.e., Maestro PayPass®), and each instance may represent a separate Maestro account having a unique account number. In some embodiments, an application selection function 118 may allow a user to select an active application and may communicate the selection to application manager 1 104 and application manager 2 106.

Application manager 1 104 and application manager 2 106 may each have several functions. One function of application manager 1 104 and application manager 2 106 may be to allow a wireless smart device to contain multiple instances of the same application, where the application specification prohibits multiple instances of the same application type on a single wireless smart device. In this case, compliance with the application specification requires that from the perspective of reader 100, device 102 appears to contain only one application of that type. In FIG. 1, application manager 1 104 and application manager 2 106 each may appear to reader 100 to be an application of a particular type. Application manager 1 104 may appear to reader 100 as a single MasterCard PayPass® application, for example, while application manager 2

Figure 2:
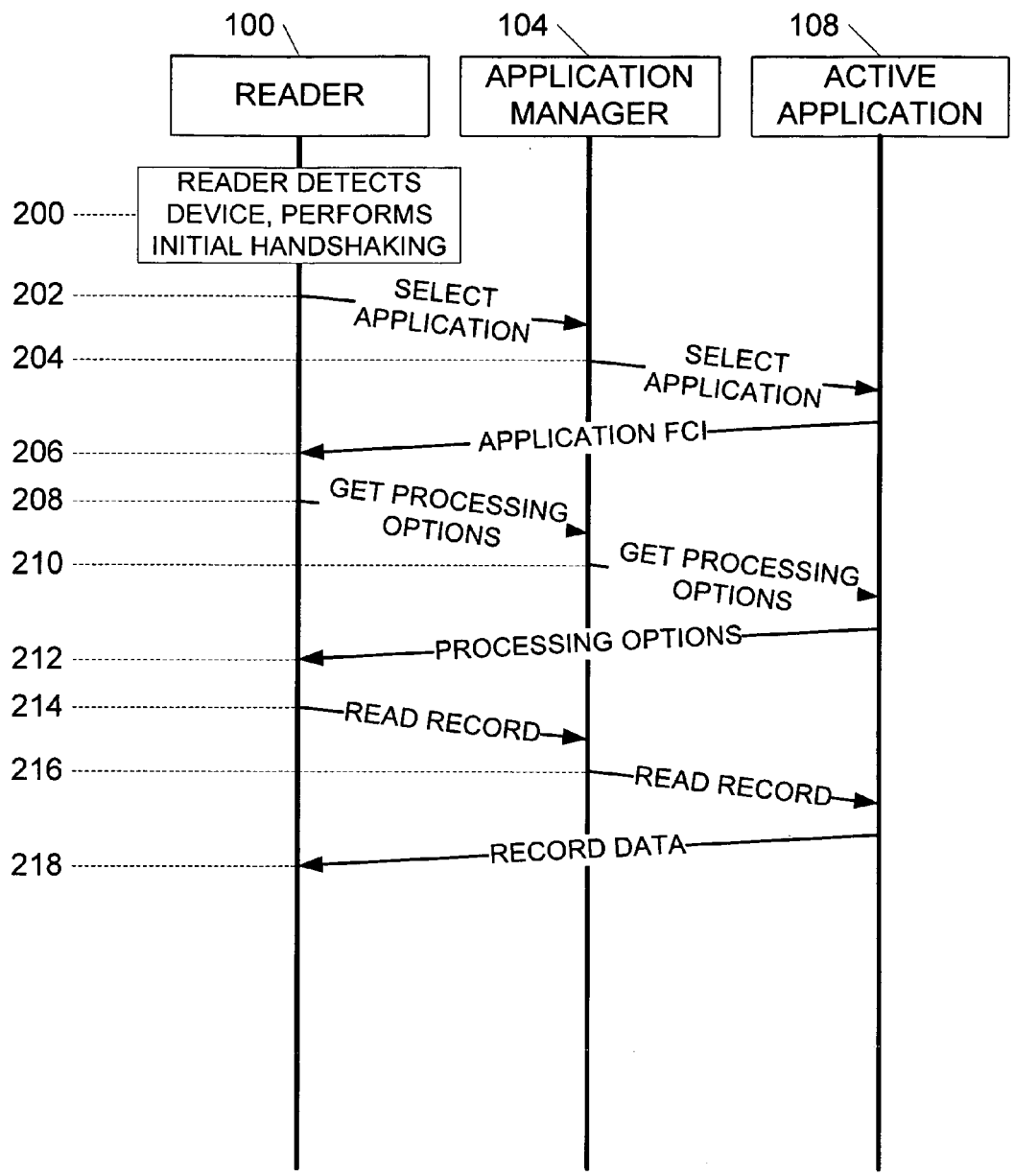
FIG. 2 is a message flow diagram illustrating the steps of an exemplary wireless payment transaction according to an embodiment of the subject matter therein.

106 may appear to reader 100 as a single Maestro PayPass® application. More specifically, if a PayPass® reader 100 requests from device 102 a list of payment applications available on device 102, the list may include application manager 1 104 (presented as a MasterCard PayPass® application) and application manager 2 106 (presented as a Maestro PayPass® application) rather than including the actual PayPass® applications application 1 108 through application 5 116. In other words, the actual PayPass® applications are, in one sense, hidden behind their respective account managers—at least from discovery through normal inquiry by reader 100. When reader 100 performs a MasterCard PayPass® transaction with device 102, it appears to reader 100 that device 102 contains only one MasterCard PayPass® application in compliance with the PayPass® specification, when in actuality there are three MasterCard PayPass® applications within device 102. FIG. 2, below, illustrates an example such transaction in detail.

Examples of other functions that may be performed by application manager 1 104 and application manager 2 106 include: managing multiple applications of the same type or of different types; notifying the user of completion of a transaction; disabling a wireless smart device's ability to do some (or all) types of transactions; and allowing a user to selectively activate or deactivate individual applications, regardless of type. A user may desire this feature as a means to avoid accidental or malicious transactions from occurring without the user's knowledge, or to avoid the use of a payment account which has reached its credit limit, for example.

FIG. 2 is a message flow diagram illustrating the steps of an exemplary wireless payment transaction according to an embodiment of the subject matter described herein. Although FIG. 2 is a simplified illustration of a wireless transaction in conformance with the 14443 Specification, the use of other communication specifications and protocols is within the scope of the subject matter described herein. Referring to FIG. 2, in step 200, wireless smart device 102 is placed within the detection field of reader 100, which detects the presence of device 102. In some embodiments, device 102 may power up. Device 102 may perform some initialization. Device 102 and reader 100 may perform a handshaking procedure. Reader 100 may request device 102 to provide to reader 100 information about the available applications residing on device 102. In some embodiments, information about available applications residing within device 102 is provided at the application level. In response to that request, device 102 may return a list or a pointer to a list, or may otherwise convey to reader 100 information about the applications available on device 102. That information may include the application type or AID for each application. For example, payment terminals may make a request to an application on device 102, such as the payment system environment (PSE) or the PayPass® payment system environment (PPSE), to return a list of payment applications available on device 102. Reader 100 may choose an appropriate application, if available, from the list. Further communication from reader 100 may be directed to the chosen application, identified by its AID. In embodiments of the subject matter described herein, in response to a request for information about applications, device 102 may return the AID of application manager 1 104 instead of the AIDs of application 1 108, application 2 110, or application 3 112. Application manager 1 104 presents itself to reader 100 as an application of the same type as the applications that it manages (i.e., a MasterCard PayPass® application.) Similarly, device 102 may return the AID of application manager 2 106 instead of the AIDs of application 4 114 or application 5 116. Application manager 2 106 presents itself to reader 100 as an application of the same type as the applications that it manages (i.e., a Maestro PayPass® application.)

In step 202, reader 100 may issue a command to select or otherwise initiate communication with the chosen application, such as the SELECT command. Reader 100 may select application manager 1 104, which appears to reader 100 as a payment application. Future communication from reader 100 will be directed toward application manager 1 104.

In step 204, application manager 1 104 may determine which of its managed applications is the active application. Referring to FIG. 1, application 1 108 is the active application, having been previously activated or selected by application selection function 118, which may be a user selection through a menu, for example, or prior configuration through an alternate means. Each application may have its own unique internal AID, which application manager 1 104 may use to identify and communicate with individual applications. For example, application 1 108 may have an AID of "A0 00 00 02 99 04 10 10 57 10", application 2 110 may have an AID of "A0 00 00 02 99 04 10 10 57 01", and application 3 112 may have an AID of "A0 00 00 02 99 04 10 10 57 10". Returning to FIG. 2, application manager 1 104 may forward the SELECT command to active application 1 108, identifying the application by its internal AID. Alternatively, application manager 1 104 may issue its own internal command to application 1 108 rather than forwarding the SELECT command issued by reader 100. Although it is theoretically possible that reader 100 may attempt to bypass an application manager and contact the managed applications directly (by somehow discovering—or guessing—the AID of one of the managed applications and issuing a SELECT command to that AID) the managed applications may be programmed to reject requests received directly from a reader. For example, application 1 108 may be able to distinguish between a request from a reader 100 (an external request) and a request from an application manager 1 104 (an internal request) and respond only to internal requests. An external request may be distinguished from an internal request by, for example, using a different protocol for an internal request, using a different communications path for the internal request, using a different command, command argument, or command option for an internal request, setting a flag to enable a transaction command just prior to issuing the transaction, or by other mechanisms and methods that do not depart from the scope of the subject matter described herein.

In step 206, active application 1 108 may respond to the SELECT command (or internal command) by sending information about itself, such as the name of application 1 108 (e.g., "BankA Credit Card") for example, to reader 100. The response may also include the AID of the application responding, in which case the identified application may respond, not with the application's internal AID, but with the AID of application manager 1 104; otherwise, reader 100 may reject the response, since from the point of view of reader 100, the application that responded (i.e., application 1 108) was not the application to which the request was sent (i.e., application manager 1 104).

The remainder of the communication between reader 100 and device 102 may follow the same basic process: reader 100 may send a request to application manager 1 104; application manager 1 104 may forward or reissue the request internally to application 1 108; application 1 108 may send a response back to reader 100. In an alternate embodiment, application 1 108 may send a response to another entity within device 102, such as application manager 1 104, which may forward or reissue the response to reader 100. Steps 208 through 218 illustrate an example payment transaction. In steps 208, 210, and 212, reader 100 may request and receive processing options in preparation for the execution of a financial transaction. In steps 214, 216, and 218, reader 100 may request and receive one or more data records. The data conveyed to reader 100 may include, for example, the equivalent of the data contained on tracks 1 and 2 of a magstripe device, such as the name of the account holder or card holder, the account number, the expiration date, etc. Steps 214 through 218 may be repeated as many times as necessary to complete the transaction. In some embodiments, the wireless smart device may prompt the user for a personal identification number (PIN) or other authorization code. If reader 100 determines that the transaction is valid, it may complete the process by executing the payment transaction with the bank, financial institution, or other issuing authority of the account represented by the active payment application.

Figure 3:
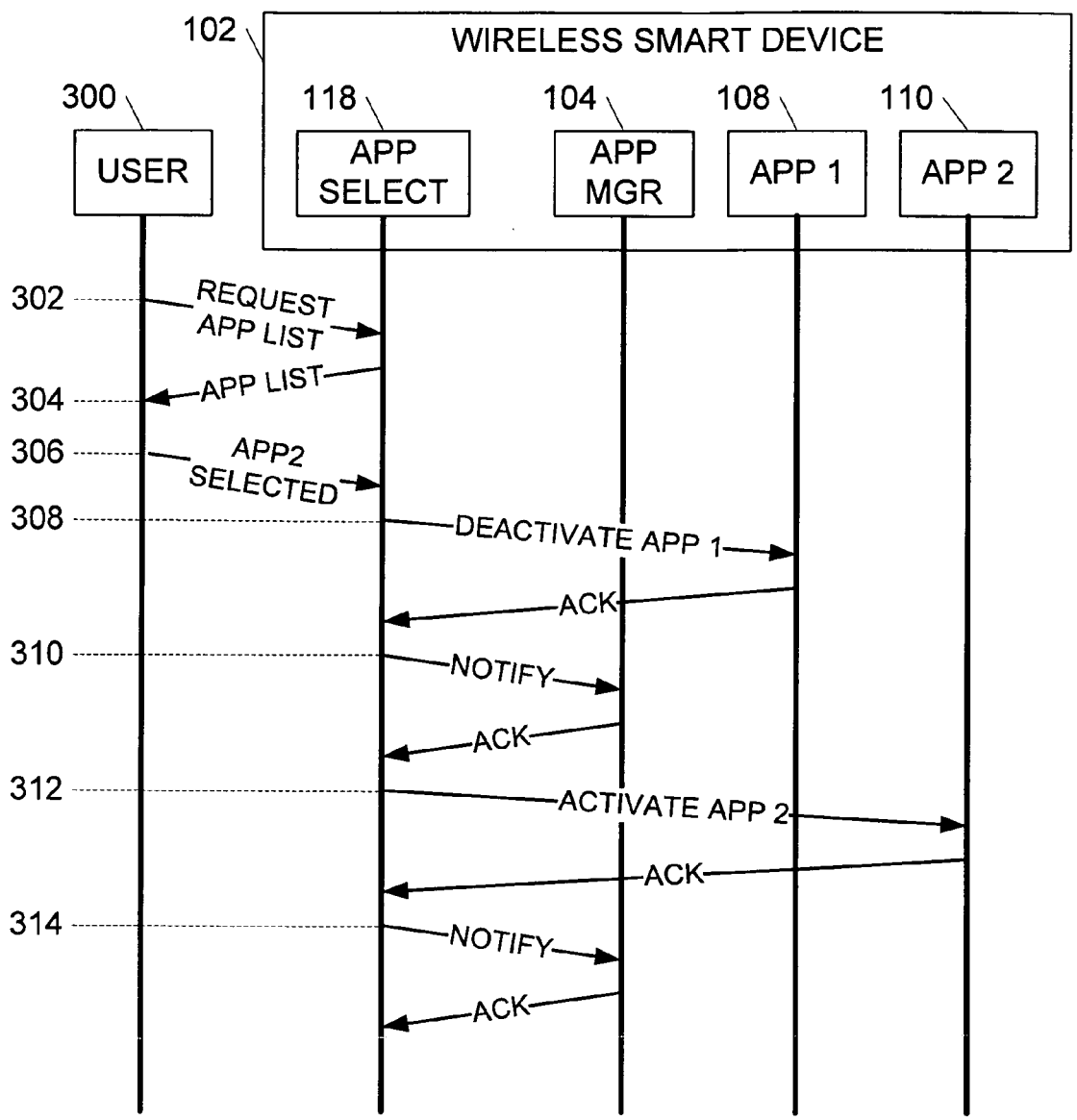
FIG. 3 is a message flow diagram illustrating the steps of an exemplary payment application selection according to an embodiment of the subject matter therein.

FIG. 3 is a message flow diagram illustrating the steps of an exemplary application selection according to an embodiment of the subject matter described herein. Referring to FIG. 3, user 300, in step 302, invokes application selection function 118 in preparation for making a transaction. Alternatively, application selection function 118 may be invoked by device 102 as part of a wireless transaction, for example, to give user 300 an opportunity to verify that the desired application is currently activated. In step 304, application selection function 118 may present to user 300 a list of available applications from which user 300 may select an application to be activated. The list may be limited to include only those types of applications that are supported by reader 100 (not shown). In step 306, user 300 may select application 2 110. Alternatively, application selection function 118 may determine that there is only one application of the type supported by reader 100, and activate that application without user interaction, in which case step 302 through step 306 do not occur. In step 308, in response to selection, by user 300 or otherwise, of an application to be activated, application selection function 118 may deactivate any currently active instance of the same application, such as application 1 108. In step 310, application selection function 118 may notify application manager 1 104 that previously activated application 1 108, which it manages, has been deactivated. In step 312, application selection function 118 may activate the selected application, application 2 110. In step 314, application selection function 118 may notify application manager 1 104 that previously inactive application 2 110, which it manages, has been activated.

It should be noted that the activation and deactivation of instances of one application may not affect the status of instances of another application. Referring to FIG. 1, for example, activating application 2 110 may cause previously active application 1 108 to be deactivated, but the status of application 4 114 and application 5 116 may not be affected, since they are instances of one application while application 1 108, application 2 110, and application 3 112 are instances of another, different application. Alternatively, activation of one application may cause all other applications or instances of applications, regardless of application or type, to be deactivated. For example, activating application 4 114 may deactivate not only application 5 116, but also application 1 108, application 2 110, and application 3 112.

In an alternate embodiment, application selection function 118 may, in response to selection, by user 300 or otherwise, notify application manager 1 104 that one of its managed applications has been selected for activation. In response to receipt of that notification, application manager 1 104, rather than application selection function 118, may deactivate currently active instances of the selected application and activate the selected instance of the application. In embodiments where an application manager manages different applications, application manager 1 104, rather than application selection function 118, may activate selected applications either with or without deactivating applications that were active prior to operation of application selection function 118.

In embodiments where in response to a request from reader 100 for information about available applications residing with device 102, device 102 communicates a list containing a list of available applications within device 102, that list may be dynamically modified by application selection function 118 such that when an instance or application is selected to be active, the list is changed so that the list includes the selected application. Optionally, the list may be further modified to remove from the list instances or applications that were not selected. In this way, when reader 100 receives the list of available applications from device 102, that list may be reduced or constrained to contain only one instance or application, thus removing from reader 100 the need or ability to make its own selection process. This allows user 300, rather than reader 100, to control which application will be used by reader 100. For example, for embodiments in which device 102 uses a PSE to communicate the list of available applications to reader 100, the list returned may contain only the last instance or application activated by application selection function 118.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for supporting a plurality of instances of the same application, the system comprising:
 a wireless smart device for communicating with a wireless reader, the wireless smart device including:
  (a) a plurality of instances of a same application for performing wireless transactions with an external device, each of the plurality of instances of the application having a different first application identifier and each of the plurality of instances of the application being of a same type, which has a second application identifier that is different from any of the first application identifiers, wherein the application is an entity that performs a function and wherein the instances are entities that perform the function; and
  (b) an application manager for identifying one of the instances associated with the second application identifier as active, for detecting a request from the wireless reader for performing a wireless transaction with an application, the request identifying the application by the second application identifier, and for communicating the request to the identified active instance and identifying the active instance using its respective first application identifier.

2. The system of claim 1 wherein the wireless smart device comprises one of a mobile telephone, a key fob, a physical card, a personal digital assistant, and a device provisioned with a soft card.

3. The system of claim 1 wherein the wireless smart device is adapted to communicate using a close-proximity wireless technology.

4. The system of claim 1 wherein the wireless smart device is adapted to communicate using a near field communications technology.

5. The system of claim 1 wherein the application comprises an application for effecting identity transactions.

6. The system of claim 1 wherein the application comprises an application for effecting security transactions.

7. The system of claim 1 wherein the application comprises an application for effecting authentication transactions.

8. The system of claim 1 wherein the application comprises an application for effecting membership transactions.

9. The system of claim 1 wherein the application comprises an application for effecting loyalty transactions.

10. The system of claim 1 wherein the application comprises an application for effecting electronic payment transactions.

11. The system of claim 1 wherein the application manager, by communicating with the active instance, makes the wireless smart device comply with a specification that limits the number of instances of the same application on the wireless smart device to one or that limits the number of instances of the same application that can respond to requests addressed to the second application identifier to one.

12. The system of claim 1 comprising an application selection function for selecting one of the plurality of instances to be active.

13. The system of claim 12 wherein the application selection function is adapted to present to a user a list of available instances, to receive an instance selection from the user, and in response to the selection to activate the selected instance.

14. The system of claim 12 wherein the application selection function, in response to selecting one of the plurality of instances to be active, deactivates any instance that is not the instance selected to be active.

15. The system of claim 12 comprising an application listing function for detecting the request from the wireless reader for a list of applications available within the wireless smart device, and responsive to detecting that request, communicating the list of available applications to the wireless reader, and wherein the application selection function is adapted to modify, in response to selecting one of the plurality of instances to be active, the list of available applications such that the selected instance is included in the list of available applications.

16. The system of claim 15 wherein the application selection function is adapted to modify, in response to selecting one of the plurality of instances to be active, the list of available applications such that instances that are not the selected instance are removed from the list of available applications.

17. The system of claim 15 wherein the application listing function is performed by a payment system environment (PSE) application.

18. A system for supporting a plurality of applications, the system comprising:
   a wireless smart device including:
   (a) a plurality of applications for performing wireless transactions with an external device, each application having a different first application identifier, wherein at least some of the applications are of a same type, which has a second application identifier that is different from any of the first application identifiers, wherein each application is an entity that performs a function; and
   (b) an application manager for detecting a request from a wireless reader for performing a wireless transaction with an application the request identifying the application by the second application identifier, for identifying one of the applications associated with the second application identifier as the target of the request, for determining that the identified target application is active, and, responsive to the determination, communicating the request to the identified target application and identifying the target application using its respective first application identifier.

19. The system of claim 18 wherein the wireless smart device comprises one of a mobile telephone, a key fob, a physical card, a personal digital assistant, and a device provisioned with a soft card.

20. The system of claim 18 wherein the wireless smart device is adapted to communicate using a close-proximity wireless technology.

21. The system of claim 18 wherein the wireless smart device is adapted to communicate using a near field communications technology.

22. The system of claim 18 wherein the plurality of applications includes an application for effecting identity transactions.

23. The system of claim 18 wherein the plurality of applications includes an application for effecting security transactions.

24. The system of claim 18 wherein the plurality of applications includes an application for effecting authentication transactions.

25. The system of claim 18 wherein the plurality of applications includes an application for effecting membership transactions.

26. The system of claim 18 wherein the plurality of applications includes an application for effecting loyalty transactions.

27. The system of claim 18 wherein the plurality of applications includes an application for effecting electronic payment transactions.

28. The system of claim 18 wherein the plurality of applications includes a plurality of applications of the same type.

29. The system of claim 18 wherein the plurality of applications includes a plurality of instances of the same application.

30. The system of claim 18 wherein the application manager, by communicating with the active application, makes the wireless smart device comply with a specification that limits the number of applications of the same type on the wireless smart device to one or that limits the number of applications that can respond to requests addressed to the second application identifier to one.

31. The system of claim 18 comprising an application selection function for selecting one of the plurality of applications to be active.

32. The system of claim 31 wherein the application selection function is adapted to present to a user a list of available applications, to receive an application selection from the user, and in response to the selection to activate the selected application.

33. The system of claim 31 wherein the application selection function, in response to selecting one of the plurality of instances to be active, deactivates any instance that is not the instance selected to be active.

34. The system of claim 31 comprising an application listing function for detecting a request from the wireless reader for a list of applications available within the wireless smart device, and responsive to detecting that request, communicating a list of available applications to the wireless reader, and wherein the application selection function is adapted to modify, in response to selecting one of the plurality of instances to be active, the list of available applications such that the selected instance is included in the list of available applications.

35. The system of claim 34 wherein the application selection function is adapted to modify, in response to selecting one of the plurality of instances to be active, the list of available applications such that instances that are not the selected instance are removed from the list of available applications.

36. The system of claim 34 wherein the application listing function is performed by a payment system environment (PSE) application.

37. A method for supporting a plurality of instances of the same application on a wireless smart device, the method comprising:
(a) using an application manager residing within the wireless smart device having a plurality of instances of a same application for effecting wireless transactions with an external device, each of the plurality of instances of the application having a different first application identifier and each of the plurality of instances of the application being of a same type, which has a second application identifier that is different from any of the first application identifiers, wherein the application is an entity that performs a function and wherein the instances are entities that perform the function:
   i) receiving a request from a wireless reader for effecting a transaction with an application, the request identifying the application by the second application identifier; and
   ii) responsive to the request from the wireless reader, identifying one of the instances associated with the second application identifier and; residing within the wireless smart device as active, and sending the request for effecting the transaction to the identified active instance and identifying the active instance using its respective first application identifier; and
(b) using the active instance identified using its respective first application identifier and associated with the second application identifier:
   i) receiving the request from the application manager for effecting the transaction; and
   ii) responsive to the request from the application manager, effecting the transaction.

38. The method of claim 37 wherein using the wireless smart device comprises using one of a mobile telephone, a key fob, a physical card, a personal digital assistant, and a device provisioned as a soft card.

39. The method of claim 37 wherein receiving a request from and sending a response to the wireless reader includes communicating using a close-proximity wireless technology.

40. The method of claim 37 wherein receiving a request from and sending a response to the wireless reader includes communicating using a near field communications technology.

41. The method of claim 37 wherein the application comprises an application for effecting identity transactions.

42. The method of claim 37 wherein the application comprises an application for effecting security transactions.

43. The method of claim 37 wherein the application comprises an application for effecting authentication transactions.

44. The method of claim 37 wherein the application comprises an application for effecting membership transactions.

45. The method of claim 37 wherein the application comprises an application for effecting loyalty transactions.

46. The method of claim 37 wherein the application comprises an application for effecting electronic payment transactions.

47. The method of claim 37 wherein receiving the request from a wireless reader includes receiving a request for effecting a wireless payment transaction.

48. The method of claim 37 wherein effecting the transaction includes sending a response to the wireless reader using the active instance.

49. The method of claim 37 wherein effecting the transaction includes sending a response to the application manager using the active instance and, in response to receiving, by the application manager, a response from the active instance, sending a response to the wireless reader using the application manager.

50. The method of claim 37 wherein, by using the application manager for communicating with the active instance, the wireless smart device complies with a specification that limits the number of instances of the same application on the wireless smart device to one or that limits the number of instances of the same application that can respond to requests addressed to the second application identifier to one.

51. The method of claim 37 comprising selecting, using an application selection function, one of the plurality of instances and activating the selected instance.

52. The method of claim 51 wherein using the application selection function includes presenting to a user a list of available instances from which the user may select an instance to be activated, determining which instance is selected by the user, and responsive to the determination, activating the selected instance.

53. The method of claim 51 wherein using the application selection function includes deactivating any instance that is not the selected instance.

54. The method of claim 51 comprising detecting a request from the wireless reader for a list of applications available within the wireless smart device, and responsive to detecting that request, communicating a list of available applications to the wireless reader, and wherein using the application selection function includes modifying, in response to selecting one of the plurality of instances, the list of available applications to include in the list of available applications the selected instance.

55. The method of claim 54 comprising modifying, in response to selecting one of the plurality of instances, the list of available applications to remove from the list of available applications any instance that is not the selected instance.

56. The method of claim 54 including using a payment system environment (PSE) application for communicating the list of available applications to the wireless reader.

57. A method for supporting a plurality of applications on a wireless smart device, the method comprising:
(a) using an application manager residing within the wireless smart device having a plurality of applications for performing wireless transactions with an external device, each application having a different first application identifier wherein at least some of the applications are of a same type, which has a second application identifier that is different from any of the first application identifiers, wherein each application is an entity that performs a function:
   i) receiving a request from a wireless reader for effecting a transaction with an application, the request identifying the application by the second application identifier; and
   ii) responsive to the request from the wireless reader, identifying one of the applications associated with the second application identifier and residing within the wireless smart device as a target of the request, determining that the identified target application is active, and, responsive to that determination, communicating the request to the identified target application and identifying the target application using its respective first application identifier; and
(b) using the target application identified using its respective first application identifier and associated with the second application identifier:

i) receiving the request from the application manager for effecting the transaction; and
ii) responsive to the request from the application manager, effecting the transaction.

58. The method of claim 57 wherein using the wireless smart device comprises using one of a mobile telephone, a key fob, a physical card, a personal digital assistant, and a device provisioned as a soft card.

59. The method of claim 57 wherein receiving a request from and sending a response to the wireless reader includes communicating using a close-proximity wireless technology.

60. The method of claim 57 wherein receiving a request from and sending a response to the wireless reader includes communicating using a near field communications technology.

61. The method of claim 57 wherein the plurality of applications includes at least one application for effecting identity transactions.

62. The method of claim 57 wherein the plurality of applications includes at least one application for effecting security transactions.

63. The method of claim 57 wherein the plurality of applications includes at least one application for effecting authentication transactions.

64. The method of claim 57 wherein the plurality of applications includes at least one application for effecting membership transactions.

65. The method of claim 57 wherein the plurality of applications includes at least one application for effecting loyalty transactions.

66. The method of claim 57 wherein the plurality of applications includes at least one application for effecting electronic payment transactions.

67. The method of claim 57 wherein the plurality of applications includes a plurality of applications of the same type.

68. The method of claim 57 wherein effecting the transaction includes sending a response to the wireless reader using the target application.

69. The method of claim 57 wherein effecting the transaction includes sending a response to the application manager using the target application and, in response to receiving, by the application manager, a response from the target application, sending a response to the wireless reader using the application manager.

70. The method of claim 57 wherein, by using the application manager for communicating with the target application, the wireless smart device complies with a specification that limits the number of applications of the same type on the wireless smart device to one or that limits the number of applications that can respond to requests addressed to the second application identifier to one.

71. The method of claim 57 comprising selecting, using an application selection function, one of the plurality of applications and activating the selected application.

72. The method of claim 71 wherein using the application selection function includes presenting to a user a list of available applications from which the user may select an application to be activated, determining which application is selected by the user, and responsive to the determination, activating the selected application.

73. The method of claim 71 wherein using the application function includes deactivating any application that is not the selected application.

74. The method of claim 71 comprising detecting a request from the wireless reader for a list of applications available within the wireless smart device, and responsive to detecting that request, communicating a list of available applications to the wireless reader, and wherein using the application selection function includes modifying, in response to selecting one of the plurality of applications, the list of available applications to include in the list of available applications the selected application.

75. The method of claim 74 comprising modifying, in response to selecting one of the plurality of applications, the list of available applications to remove from the list of available applications any application that is not the selected application.

76. The method of claim 74 including using a payment system environment (PSE) application for communicating the list of available applications to the wireless reader.

77. A computer program product comprising computer-executable instructions embodied in a computer-readable medium for performing steps comprising:
(a) using an application manager residing within the wireless smart device having a plurality of instances of a same application for effecting wireless transactions with an external device, each application having a different first application identifier wherein at least some of the applications are of a same type, which has a second application identifier that is different from any of the first application identifiers, wherein the application is an entity that performs a function and wherein the instances are entities that perform the function:
i) receiving a request from a wireless reader for effecting a transaction with an application, the request identifying the application by the second application identifier; and
ii) responsive to the request from the wireless reader, identifying one of the instances associated with the second application identifier and residing within the wireless smart device as active, and sending the request for effecting the transaction to the identified active instance and identifying the active instance using its respective first application identifier; and
(b) using the active instance identified using its respective first application identifier and associated with the second application identifier:
i) receiving the request from the application manager for effecting the transaction; and
ii) responsive to the request from the application manager, effecting the transaction.

78. A computer program product comprising computer-executable instructions embodied in a computer-readable medium for performing steps comprising:
(a) using an application manager residing within the wireless smart device having a plurality of applications for performing wireless transactions with an external device, each application having a different first application identifier, wherein at least some of the applications are of a same type, which has a second application identifier that is different from any of the first application identifiers, wherein each application is an entity that performs a function:
i) receiving a request from a wireless reader for effecting a transaction with an application, the request identifying the application by the second application identifier; and
ii) responsive to the request from the wireless reader, identifying one of the applications associated with the second application identifier and residing within the wireless smart device as a target of the request, determining that the identified target application is active, and, responsive to that determination, communicating the request to the identified target application and identifying the target application using its respective first application identifier; and (b) using the target application identified using its respective first application identifier and associated with the second application identifier:
  i) receiving the request from the application manager for effecting the transaction; and
  ii) responsive to the request from the application manager, effecting the transaction.

* * * * *